UNITED STATES PATENT OFFICE.

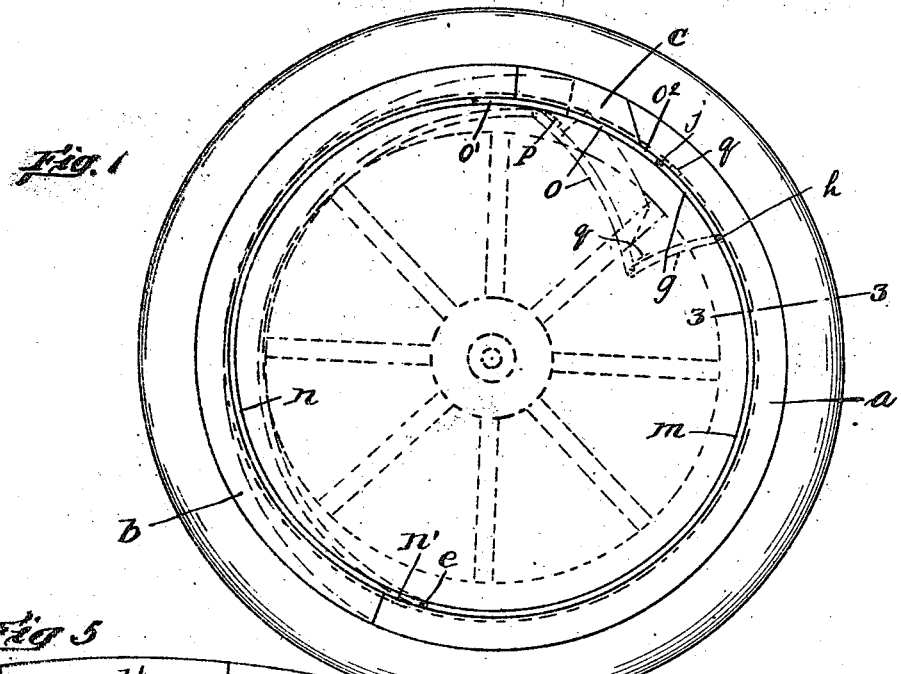
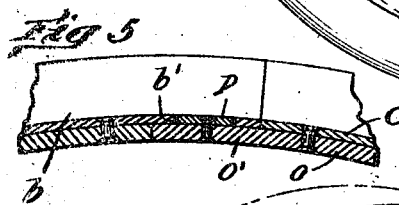
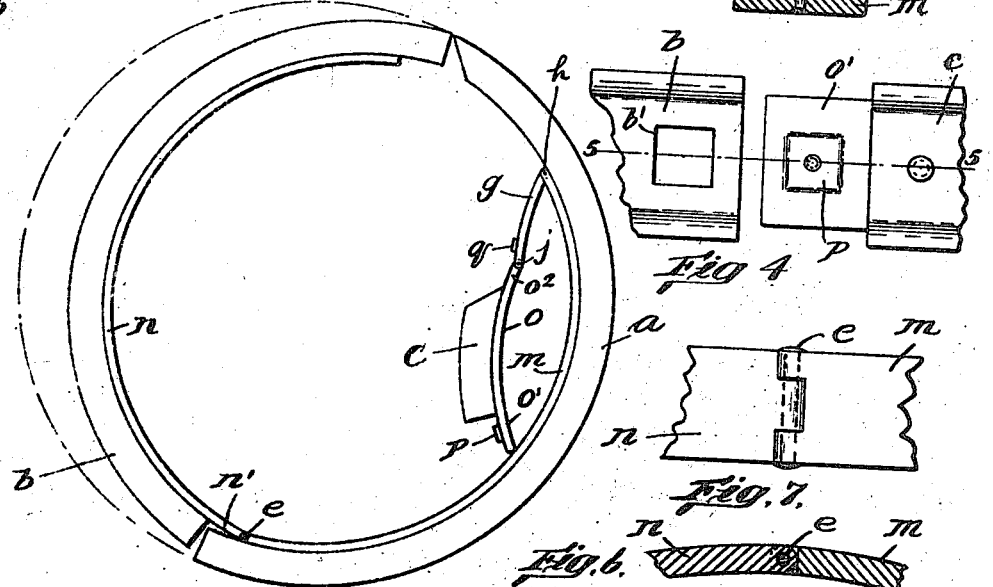

TIMOTHY S. YORK, OF HAVERHILL, MASSACHUSETTS, ASSIGNOR TO LOUIS H. HARRIMAN, OF HAVERHILL, MASSACHUSETTS, TRUSTEE FOR SAID YORK, W. SCOTT PETERS, SAMUEL E. CASS, AND FRANK M. WHITEHOUSE, ALL OF HAVERHILL, MASSACHUSETTS.

COLLAPSIBLE RIM.

1,268,799.          Specification of Letters Patent.        Patented June 4, 1918.

Application filed December 28, 1917. Serial No. 209,223.

*To all whom it may concern:*

Be it known that I, TIMOTHY S. YORK, a citizen of the United States, and a resident of Haverhill, county of Essex, and State of Massachusetts, have invented an Improvement in Collapsible Rims, of which the following is a specification.

This invention relates to certain improvements in collapsible, demountable rims and more particularly to improvements on the particular type of rim disclosed in my pending application, Serial #137295 in which a complemental rim section is connected to the main portion of the rim by a link, which is located within the main rim portion, said complemental section and link acting as a toggle to force apart the ends of the sections of the main rim portion with which the ends of the complemental section abut, outward movement of the toggle beyond the normal position being prevented by the overlying portion of the rim, which also prevents inward pressure on its outer periphery from forcing the toggle inward.

The object of the present invention is to improve the construction of said rim, so that it may be constructed at substantially less expense than the construction previously disclosed by me, and so that the material of which the rim is constructed may be produced by a rolling process, thereby avoiding the use of castings and, to a large extent, the necessity of machine work, at the same time increasing the strength and durability of the rim.

I accomplish this object by providing a tire-receiving outer rim of ordinary form, and a flat inner rim of uniform width and thickness, which is disposed on the inner periphery of the outer rim, said outer and inner rims being formed in corresponding section with abutting ends, and the rim portions of each section being permanently secured together, said sections being connected by pivotal connections between the adjacent ends of the inner rim sections.

For a more complete understanding of my invention, reference is made to the accompanying drawing in which:—

Figure 1 is a side elevation of a demountable rim made according to my invention.

Fig. 2 is a similar view, showing the rim in completely collapsed form.

Fig. 3 is a cross sectional view of the rim, on an enlarged scale, taken at line 3—3 of Fig. 1.

Fig. 4 is a detail plan view of the adjacent end-portions of the rim sections.

Fig. 5 is a sectional view at line 5—5 of Fig. 4.

Figs. 6 and 7 are detail views of one of the hinge connections of the inner rim.

As shown in the drawing, the entire rim comprises an outer rim of ordinary form, having a cylindrical middle portion of uniform thickness and two edge flanges to form a tire-receiving groove on its outer periphery, and an inner rim of uniform thickness and of the same width as the inner peripheral surface of the outer rim, the latter being secured thereto, at certain points, as hereafter explained, by rivets or other permanent securing means extending through both rims, as indicated in Fig. 3. The rim is divided into two main rim sections and a complemental section, as in my previously disclosed construction.

According to my present invention, said main sections comprise outer rim-portions $a$ and $b$, each of which extends throughout nearly a semi-circumference, and said complemental section comprises an outer rim portion $c$, which completes the rim, when the ends of said rim portions are abutted. An inner rim section $m$ is riveted to the inner periphery of the section $a$, and extends from a point removed from the end of the latter next the section $c$ to a point removed from the end next the section $b$, and an inner rim section $n$ is riveted to the inner periphery of the section $b$ and extends from a point removed from the end of the latter next the section $c$ to a point beyond the opposite end of the section $b$, where it meets the adjacent end of the inner section $m$, said meeting ends of the sections $m$ and $n$ being provided with a corresponding tongue and recess and pivotally connected by a pivot $e$, as shown in Figs. 6 and 7, so that the extended portion $n'$ of the rim-section $n$ overlaps the joint between the sections $a$ and $b$.

The complemental section $c$ has an inner rim section $o$ riveted to its inner side, which extends throughout the length and beyond each end of said section $c$, the extending end portion $o'$ thereof being adapted to meet the adjacent end of the section $n$ when the adjacent ends of the sections $b$ and $c$ are abutted. The opposite end portion $o^2$ of the section $o$ is pivotally connected by a pivot $j$, in a manner similar to that already described, and shown in Figs. 6 and 7, to one end of an inner rim-section $g$, the opposite end of which is connected, by a pivot $h$, to the adjacent end of the section $m$, the combined length of the end portion $o^2$ and section $g$, being equal to the distance which said end of section $m$ is removed from the adjacent end of section $a$. The pivot $h$ is arranged to permit the section $g$ to swing inward and the pivot $j$ is arranged to permit the section $o$ to swing outward with relation to section $g$, said sections thus forming the two members of a toggle. The meeting faces of the sections $a$ and $b$ and of the sections $b$ and $c$ are approximately square or radial and those of the sections $a$ and $c$ are oblique, or somewhat inclined toward the pivot $j$, as shown. The meeting ends of the section $n$ and extension $o'$ are preferably correspondingly rounded and recessed, to provide pivotal bearing surfaces and the extension $o'$ has a rectangular shaped projection or lug $p$ pivoted to its side next the section $b$ and the end portion of the latter is provided with a correspondingly shaped aperture $b'$, said lug and aperture being relatively arranged so that the one enters the other, when the sections $b$ and $c$ are in their normal relative positions and will act to lock said section against longitudinal separation and prevent the abutting end portions of said sections from being moved transversely one with relation to the other. A similar projection $q$ and a corresponding aperture in the adjacent outer rim portion $a$, may be provided on the link $g$ to relieve the pivot $h$ from transverse strain.

The manner of collapsing the rim to permit the tire to be placed thereon, and of stretching the tire thereon, after it has been placed in position, is identical to that described with relation to my previous construction, that is, when the parts are in the collapsed position of Fig. 2, and the tire has been placed thereon, the end portion $o'$ of the rim section $o$ is placed against the adjacent end of section $n$, as in the dotted line position of Fig. 1, and then the toggle, thus formed, is pressed outward at its joint or pivot $j$ until the adjacent ends of sections $a$ and $b$ are pressed apart and the section $c$ is forced therebetween, at which time the link $g$ will be forced against the adjacent inner peripheral surface of the section $a$, as shown in full lines in Fig. 1. In moving the parts to this position, the center of the toggle, which is at the center of pivot $j$, will pass the line of centers from pivot $h$ to the end of extension $o'$, so that tension on the tire, tending to swing the sections $a$ and $b$ together, will merely press the link $g$ against the inner side of the end portion of section $a$. To collapse the rim, it is merely necessary to force the joint of the toggle inward past the line of centers where the toggle is straight, and then the parts may be readily moved to the position of Fig. 2.

From the foregoing description, it will be apparent that the outer rim portion may be made from strips or bars of iron or steel rolled out into the desired transverse form and bent circularly by well known processes, the sections being formed by cutting the same across at the desired points, and that the inner rim portion may be made of ordinary flat iron bars, similarly bent and cut, the tongues and ears for the connecting pivots being readily formed at the time of the cutting operation.

The inner rim portion, as thus arranged, extends continuously about the inner periphery of the outer rim portion, providing a continuous surface corresponding to the periphery of the wheel on which it is to be placed, and reinforces the outer portion very substantially. At the same time, it also provides a convenient and effective means for enabling the practical production of a rim embodying the features of my said prior invention.

I claim:—

1. A collapsible rim comprising a plurality of tire-receiving rim sections having abutting ends, and an inner rim disposed on the inner periphery of said sections, rigidly connected thereto and composed of sections pivotally engaged adjacent the abutting ends of said tire-receiving sections.

2. A collapsible rim comprising a plurality of tire-receiving rim sections having abutting ends and an inner rim consisting of pivotally connected sections of uniform thickness disposed on the inner periphery of said tire-receiving sections, each tire-receiving section having a section of said inner rim rigidly connected thereto.

3. A collapsible rim composed of a plurality of sections having abutting ends, each section comprising a tire-receiving, outer rim portion, and an inner rim portion rigidly secured to the inner peripheral side thereof, and arranged with its abutting ends meeting and pivotally engaged at points adjacent, but out of coincidence with the joints between the abutting ends of the outer rim portion, so that the sections of each rim portion overlap the joints between the sections of the other.

4. A collapsible rim composed of a pair of main sections and a complemental section, each of said sections comprising a tire-receiving outer rim-portion having an inner rim-portion secured to its inner peripheral surface, the inner rim-portion of one of said main sections having a pivotally movable end-section, to the free end of which the inner rim-portion of said complemental section is pivotally connected, to provide therewith an inwardly breaking toggle arranged to be swung outwardly against the adjacent inner peripheral face of the outer rim portion.

5. A collapsible rim composed of a pair of main sections and a complemental section, each of said sections comprising a tire-receiving outer rim-portion having an inner rim-portion secured to its inner peripheral surface, the inner rim-portion of said complemental section being extended beyond the ends of the outer rim portion thereof to engage the inner peripheral faces of the corresponding outer rim portions of the main sections, the adjacent end portion of the inner rim-portion of one of the main sections being pivotally engaged, at one end, to the adjacent extended end of said inner rim-portion and at its opposite end to the adjacent portion of the inner rim portion of said main section.

6. A collapsible rim comprising a plurality of tire-receiving outer rim sections having abutting ends, an inner rim section secured to the inner peripheral side of one of said outer sections and extended therefrom to overlap the joint between the same and the other outer section, the overlapping portions of said outer and inner sections having a corresponding lug and aperture adapted and arranged to be inter-engaged when said sections are in normal position to hold the same against longitudinal separation.

In testimony whereof, I have signed my name to this specification.

TIMOTHY S. YORK.

Witness:
   L. H. HARRIMAN.